(12) United States Patent
Tsai et al.

(10) Patent No.: US 7,709,144 B2
(45) Date of Patent: *May 4, 2010

(54) METHODS FOR PRODUCING AGGLOMERATES OF METAL POWDERS AND ARTICLES INCORPORATING THE AGGLOMERATES

(75) Inventors: Peter Ru-Feng Tsai, Westlake, OH (US); Ning Ciu, Beachwood, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/113,653

(22) Filed: May 1, 2008

(65) Prior Publication Data

US 2008/0213666 A1 Sep. 4, 2008

Related U.S. Application Data

(62) Division of application No. 10/346,783, filed on Jan. 17, 2003, now Pat. No. 7,413,703.

(51) Int. Cl.
*H01M 4/04* (2006.01)
*H01M 4/42* (2006.01)

(52) U.S. Cl. ............... 429/209; 429/229; 429/212; 429/217; 75/770

(58) Field of Classification Search ........... 429/209, 429/229, 212, 217; 75/770
See application file for complete search history.

(56) References Cited

U.S. PATENT DOCUMENTS

| 2,480,839 | A | 9/1949 | Daniel |
|---|---|---|---|
| 3,348,976 | A | 10/1967 | Kelly et al. |
| 3,397,057 | A | 8/1968 | Harrington et al. |
| 3,445,555 | A | 5/1969 | West et al. |
| 3,627,862 | A | 12/1971 | West et al. |
| 3,645,793 | A | 2/1972 | Hein et al. |
| 3,655,447 | A | 4/1972 | Griffiths et al. |
| 4,197,635 | A | 4/1980 | Bilhorn |
| 4,383,015 | A | 5/1983 | Buzzelli |
| 4,410,607 | A | 10/1983 | Arons et al. |
| 4,470,939 | A | 9/1984 | Schoolcraft |
| 4,500,614 | A | 2/1985 | Nagamine et al. |
| 4,606,869 | A | 8/1986 | Showak |
| 5,198,315 | A | 3/1993 | Tada et al. |
| 5,240,793 | A | 8/1993 | Glaeser |

(Continued)

FOREIGN PATENT DOCUMENTS

CN 1155168 7/1997

(Continued)

OTHER PUBLICATIONS

ASM Handbook®, vol. 7, Powder Metallurgy, ASM International, 1984, p. 62.

(Continued)

*Primary Examiner*—George Wyszomierski
*Assistant Examiner*—Tima M McGuthry-Banks
(74) *Attorney, Agent, or Firm*—Russell H. Toye, Jr.

(57) ABSTRACT

Processes for making rigid, binder free agglomerates of powdered metal are disclosed. The agglomerates have a low tap density. Articles that contain binder free agglomerates made from electrochemically active powder are also disclosed.

24 Claims, 9 Drawing Sheets

U.S. PATENT DOCUMENTS

| | | | |
|---|---|---|---|
| 5,419,987 | A | 5/1995 | Goldstein et al. |
| 5,856,378 | A | 1/1999 | Ring et al. |
| 6,007,947 | A * | 12/1999 | Mayer ............. 429/231.1 |
| 6,015,636 | A | 1/2000 | Goldstein et al. |
| 6,022,639 | A | 2/2000 | Urry |
| 6,241,959 | B1 * | 6/2001 | Cho et al. ............. 423/594.4 |
| 6,284,410 | B1 | 9/2001 | Durkot et al. |
| 6,300,011 | B1 | 10/2001 | Lin et al. |
| 6,472,103 | B1 | 10/2002 | Durkot et al. |
| 6,558,447 | B1 | 5/2003 | Shekhter et al. |
| 6,706,220 | B1 | 3/2004 | Glaeser |
| 6,830,847 | B2 | 12/2004 | Ramaswami et al. |
| 7,045,253 | B2 * | 5/2006 | Clash et al. ............. 429/229 |
| 7,332,247 | B2 | 2/2008 | Horn |
| 2004/0013940 | A1 * | 1/2004 | Horn ............. 429/209 |
| 2005/0181278 | A1 * | 8/2005 | Cui et al. ............. 429/229 |

FOREIGN PATENT DOCUMENTS

| | | |
|---|---|---|
| EP | 0450112 | 10/1991 |
| JP | 57182972 | 11/1982 |
| WO | WO 9524359 | 9/1995 |
| WO | WO 9841476 | 9/1998 |
| WO | WO 9907030 | 2/1999 |
| WO | WO 0165098 | 8/2001 |

OTHER PUBLICATIONS

Randall M. German, "Powder Metallurgy Science," Metal Powder Industries Federation, $2^{nd}$ ed. 1994, pp. 31-33, 348, 349 and 433.

Bryan J. Ennis, "Agglomeration and Size Enlargement Session Summary Paper," Powder Technology 88 (1996) pp. 203-225.

European Patent Office, "Communication Pursuant to Article 96(2) EPC," May 14, 2007, for European Application No. 04 702 957.4-2119 (5 pages).

PCT "Notification of Transmittal of the International Search Report and the Written Opinion of the International Searching Authority, or the Declaration," Oct. 27, 2004, for International Application No. PCT/US2004/001112 (13 pages).

Office Action Mailed Dec. 15, 2004 for U.S. Appl. No. 10/199,702 (10 pages).

Office Action Mailed Aug. 31, 2005 for U.S. Appl. No. 10/199,702 (8 pages).

Final Office Action Mailed Feb. 23, 2006 for U.S. Appl. No. 10/199,702 (7 pages).

Office Action Mailed Sep. 7, 2006 for U.S. Appl. No. 10/199,702 (7 pages).

Final Office Action Mailed Apr. 3, 2007 for U.S. Appl. No. 10/199,702 (9 pages).

Advisory Action Mailed Jul. 25, 2007 for U.S. Appl. No. 10/199,702 (6 pages).

An SEM photomicrograph of an alkaline cell anode (previously submitted in an Information Disclosure Statement on Oct. 23, 2002, in U.S. Appl. No. 10/199,702).

* cited by examiner

METHODS FOR PRODUCING AGGLOMERATES OF METAL POWDERS AND ARTICLES INCORPORATING THE AGGLOMERATES

CROSS REFERENCE TO RELATED APPLICATION

This application is a division of U.S. patent application Ser. No. 10/346,783, filed Jan. 17, 2003, now U.S. Pat. No. 7,413,703, and entitled "METHODS FOR PRODUCING AGGLOMERATES OF METAL POWDERS AND ARTICLES INCORPORATING THE AGGLOMERATES." The aforementioned related application is hereby incorporated herein by reference.

BACKGROUND OF THE INVENTION

This invention generally relates to a process for producing agglomerates of metal powders. More particularly, this invention is directed to a process for producing rigid, porous, binder free agglomerates of metal powders. This invention is also directed to devices that include the rigid, binder free agglomerates.

Fine metal powders are used in a wide variety of devices to enable desirable chemical reactions. For example, catalysts are incorporated in the catalytic converts of vehicles powered by combustion engines. The catalyst facilitates the conversion of potentially harmful fumes to environmentally acceptable gases or liquids. In another example, metal powders are used to store gases, such as hydrogen, in a solid matrix to minimize the hazards associated with the storage and transport of hydrogen as a compressed gas. Fine metal powders are also used in batteries and fuel cells. Commercially available batteries, including both rechargeable and non-rechargeable batteries, are used to power portable devices such as flashlights, cameras and tape recorders. One chemical system used to produce rechargeable batteries incorporates a finely divided metal hydride in one of the electrodes. Another chemical system, typically used to manufacture non-rechargeable batteries, also known as primary batteries, uses an alkaline electrolyte, manganese dioxide as the active cathode material and zinc as the active anode material. The zinc is usually disposed within the central region of the battery as part of a gel. Prior to incorporating the zinc into the battery, the zinc is comminuted so that a quantity of zinc powder with a majority of particles ranging from 25 microns to 500 microns is obtained. The individual particles are suspended in the anode gel which prevents settling of the zinc particles within the battery.

One of the long-standing objectives of battery manufacturers is to produce batteries with the ability to power a device for longer and longer periods of time. The need to improve the battery's performance is especially acute in devices that require large currents. As disclosed in JP Kokai 57[1982]-182972, the high discharge characteristic of a battery can be improved by incorporating 5-30 weight percent of the zinc as particles with a particle size of 25 microns or smaller. Unfortunately, as the percentage of particles that are 25 microns or smaller increases, the viscosity of the anode may become too high to process in high speed manufacturing machines. One way to overcome this problem is to process all of the zinc particles into a single porous body. For example, U.S. Pat. No. 2,480,839 discloses an anode made of zinc powder or particles that have been compressed under sufficient pressure to agglomerate the particles into a coherent body shaped as a hollow cylinder. In another example, U.S. Pat. No. 3,645,793 describes cleaning the zinc powder with a mild acid and then pressing the zinc to form a porous structure. These patents are directed to the production of coherent structures that are suitable for use as an electrode in an electrochemical cell. All of the particles are included in the compaction process and form a part of the compacted electrode. Thus, these processes are not well suited for the production of electrodes that incorporate both agglomerated electrochemically active particles and non-agglomerated electrochemically active particles in the same electrode.

Other methods of handling the finely divided metal powders include the step of utilizing an agglomerant to form the agglomerates. The agglomerant may be a binder that acts as an adhesive to secure particles to one another thereby enabling the formation of the agglomerates. Alternatively, the agglomerant may be a pore former which facilitates the formation of the agglomerate but is then removed from the agglomerate thereby forming pores within the agglomerate. Unfortunately, the use of an agglomerant may have a negative impact on the performance of the agglomerated powder. For example, if a battery includes an electrode that uses agglomerates of electrochemically active material that incorporate an organic binder, such as polyvinyl alcohol (PVA), then the particles are inherently coated with the electrically nonconductive PVA. The coating increases the internal resistance of the electrode that includes the coated, agglomerated particles. As the electrode's internal resistance increases, the battery's run time decreases. Furthermore, there are potential problems associated with the cost of the binder as well as the volume of space occupied by the binder. As the volume of space dedicated to the binder increases, the quantity of electrochemically active material must be decreased to make room for the binder. As the quantity of active material is decreased, the cell's run time is reduced.

Therefore, there exists a need for a process that produces small, rigid, binder free agglomerates that do not compromise the performance of the agglomerated particles. The process should not require the use of an additive, such as a binder or pore former, to enable production of the agglomerates.

BRIEF SUMMARY OF THE INVENTION

The process of the present invention produces rigid, binder free agglomerates that are appropriately sized for mixing with non-agglomerated particles to produce a flowable mixture.

In one embodiment, this invention is a process that includes the steps of providing an electrochemically active material in comminuted form and then forming rigid, binder free agglomerates that consist essentially of the electrochemically active material.

In another embodiment, this invention is an electrochemical cell that includes an electrode that incorporates the rigid, binder free agglomerates that consist essentially of the electrochemically active material.

In another embodiment, this invention is a hydrogen storage vessel that incorporates the rigid, binder free agglomerates.

DETAILED DESCRIPTION OF THE INVENTION

The following terms and phrases are defined for use herein.

The phrase "rigid, binder free agglomerate," means an assemblage of particles which are rigidly joined together without the use of a binder. Therefore, each particle is physically secured to at least one other particle in the rigid, binder free agglomerate. Particles that are in close proximity to one another but are not associated via a physical connection are not considered to form a rigid, binder free agglomerate.

The term "agglomerated particles" means two or more particles that form an agglomerate.

The term "non-agglomerated particles" means two or more particles that are not physically associated with each other.

Figure 1:
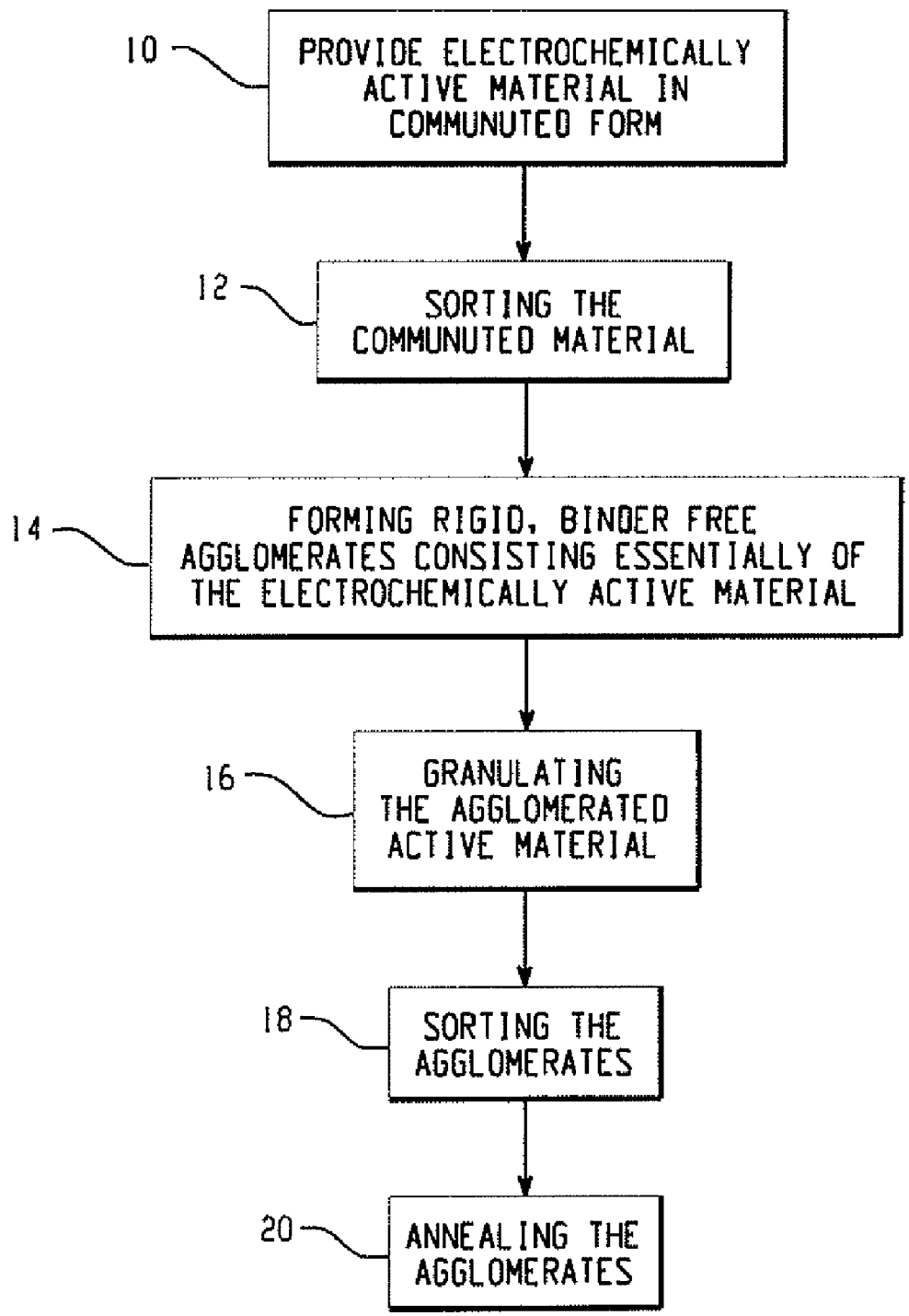
FIG. 1 shows steps in one embodiment of a process of this invention.

Referring now to the drawings and more particularly to FIG. 1, there is shown a chart of process steps including both required and optional steps. Step 10 involves providing a quantity of electrochemically active material in comminuted form. In a preferred embodiment, the active material is zinc powder that has been produced by air atomization or centrifugal atomization of molten zinc. The majority of the zinc particles typically range in size from 25 microns to 500 microns. In step 12, the particles may be sorted based on size, shape or some other characteristic before continuing with the processing of the comminuted powder. In step 14, the comminuted powder is formed into porous, rigid, binder free agglomerates that consist essentially of the electrochemically active material. Preferably the electrochemically active material accounts for one hundred percent, by weight, of the binder free, rigid agglomerates. However, due the existence of impurities in commercial manufacturing processes, minute amounts of foreign material may unintentionally become incorporated into some of the rigid, binder free agglomerates during the manufacturing process. Preferably the contaminants would account for less than one percent, by weight, of the rigid agglomerates. More preferably, the contaminants would account for less than one-tenth of one percent, by weight, of the rigid agglomerates. Most preferably, the contaminants would account for less than one-hundredth of one percent, by weight, of the rigid agglomerates.

The rigid, binder free agglomerates formed in step 14 may be manufactured to the desired density and size by adjusting process parameters in a manufacturing process, such as, a compaction process, a direct fusing process or an induction heating process. However, if the rigid agglomerates are larger than desired, they may be granulated, as represented by step 16, to reduce the size of the rigid agglomerates. Granulation may be accomplished, for example, in a machine that incorporates blades and/or beater bars to fragment the original rigid agglomerates into smaller rigid agglomerates. If desired, the fractured rigid agglomerates may then be sorted, as represented by step 18, to generate rigid agglomerates having the desired size. The sorting may be accomplished by sieving the agglomerates. The agglomerates may also be annealed as represented by step 20.

An electrochemically active material that is useful in a process of this invention is zinc or a zinc alloy that incorporates one or more of the following elements: indium, bismuth, aluminum, magnesium or lead. A suitable zinc alloy contains 100 ppm of bismuth, 200 ppm of indium and 100 ppm of aluminum. Comminuted zinc alloys that are suitable for use in electrochemical cells may be purchased from Umicore (Belgium), Noranda (Canada), Big River Zinc (United States) and Mitsui (Japan). The particles may be shaped as: flakes, as disclosed in U.S. Pat. No. 6,022,639; spherical particles, as disclosed in U.S. Pat. No. 4,606,869; various other shapes as disclosed in WO 98/50,969; or irregularly shaped.

As represented by step 12 in FIG. 1, prior to forming the porous, rigid, binder free agglomerates, the comminuted active material may be processed to isolate particles within a desirable size range. A screening process that uses a single mesh screen, such as a 200 mesh screen, is a suitable means for sorting the particles. Alternately, a two mesh screen screening process may be used. For example, the comminuted active material may be processed by selecting only those particles that will flow through a 40 mesh screen but will not flow through a 325 mesh screen. The porosity of the rigid agglomerate can be influenced by selecting particles within a specified range. A preferred range of particle sizes is 25 microns to 70 microns. A more preferred range of particle sizes is 25 microns to 50 microns.

The step of forming rigid, binder free agglomerates from the comminuted electrochemically active material can be accomplished using a variety of manufacturing processes. In a preferred embodiment, the step of forming the agglomerates utilizes a compaction process. Suitable means for forming the comminuted material into rigid, binder free agglomerates includes a roll compactor or a high pressure extruder. In addition to relying upon pressure to form the particles into agglomerates, various forms of energy may also be used with the pressure to cause the particles to become agglomerated. For example, in addition to the use of pressure, the particles may be made to directly fuse with one another by contacting some of the particles with an ultrasonic welder thereby causing some of the particles to vibrate against adjoining particles. The vibration results in the generation of sufficient heat to cause localized welding of particles to one another. Induction heating may be used instead of an ultrasonic welder to effect direct fusing of the particles.

As represented by step 20 in FIG. 1, the agglomerates of electrochemically active material may be annealed. The annealing is accomplished by heating the agglomerates to a temperature sufficient to release the stress created in the agglomerate during the process used to generate the agglomerates. For many comminuted metal powders, such as zinc, the agglomerated zinc must be heated to a temperature above 100° C. but well below the melting point of zinc. Preferably, the temperature of the agglomerate would not exceed 200° C.

Figure 3:
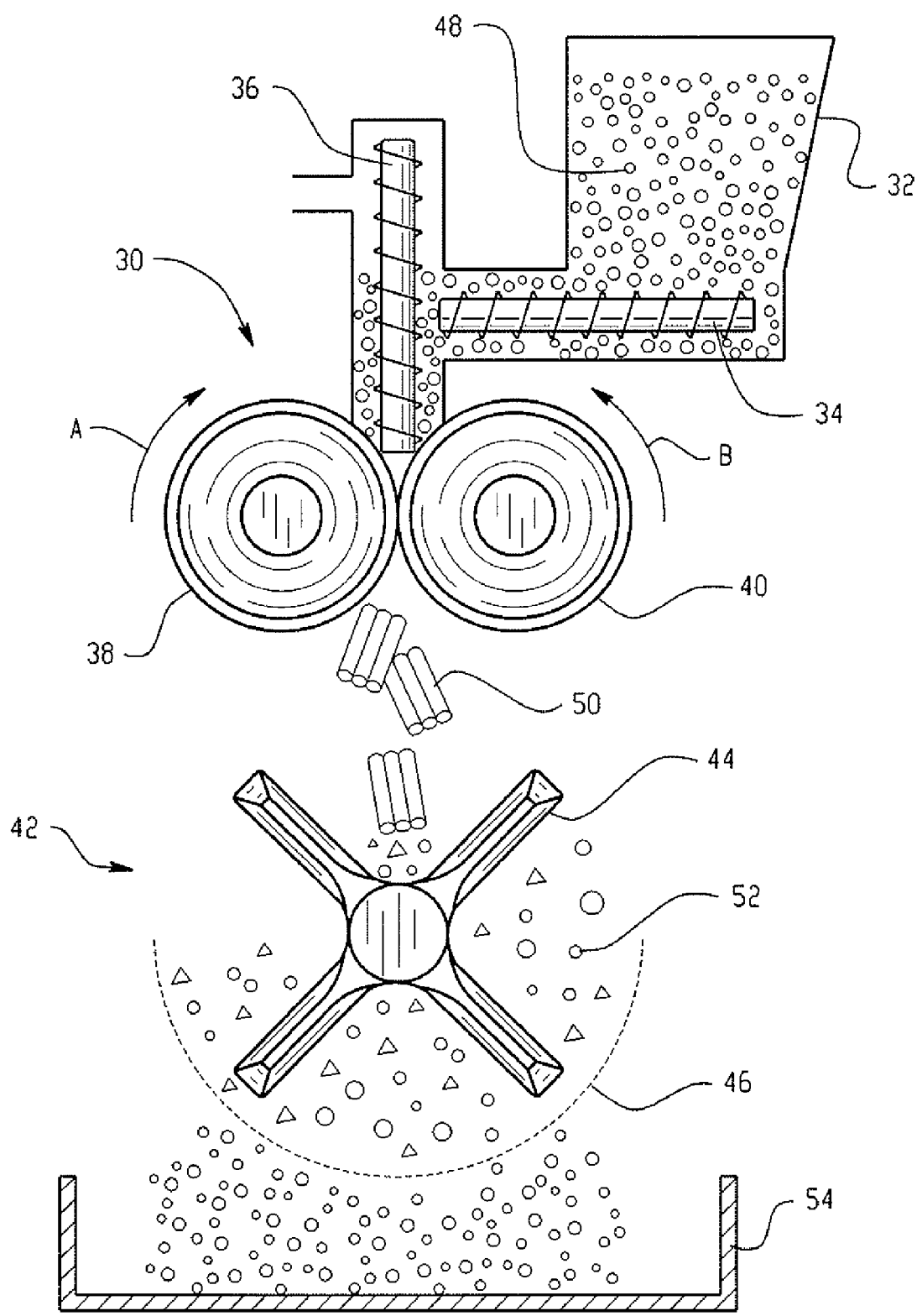
FIG. 3 is a schematic drawing of a roll compactor and granulation process.

Referring to FIG. 3, forming of the agglomerates by compaction of the particles can be accomplished by feeding a quantity of comminuted particles into the gap between opposing rolls in roll compactor 30. Compactor 30 includes a powder storage hopper 32, a first screw conveyor 34 which is a horizontal screw, a second screw conveyor 36 which is a vertical screw, a first roller 38 and a second roller 40. First roller 38 rotates in a clockwise direction, as indicated by arrow A, while second roller 40 rotates in a counterclockwise direction, as indicated by arrow B. Rollers 38 and 40 may be made of hardened steel. The gap (not shown) between rollers 38 and 40 is one of the variables that may be adjusted to form agglomerates with the desired porosity. The surface of rollers 38 and 40 may be modified to increase the coefficient of friction between the roller and the comminuted material. In a preferred embodiment, the surface of both rollers is coated with a ceramic layer to improve the coefficient of friction between the rollers and the zinc particles. Alternatively, the surface of the rollers may be sand blasted to improve their ability to grip the comminuted material and force it through the gap between the rollers.

Located beneath roll compactor 30 is granulator 42 which includes screen 46. As the comminuted powder 48 in hopper 32 is fed to and through the gap between rollers 38 and 40, the powder is formed into thin agglomerated strips 50 that are too long for use in an electrode of a cylindrical AA alkaline electrochemical cell that measures approximately 50 mm high and 14 mm in diameter. Strips 50 are made to collide with beater bar assembly 44 which fragments the pellets into smaller rigid agglomerates 52. The openings in sieving screen 46 allow a portion of the fragmented rigid agglomerates to pass through the screen and accumulate in catch basin 54. If desired, the accumulated agglomerates may be processed through additional granulation and screening machinery until rigid, binder free agglomerates within a desired size range are obtained. Preferably, the rigid, binder free agglomerates will pass through a 40 mesh screen. If desired, the agglomerates that pass through a 325 mesh screen may be eliminated.

In addition to the size of the agglomerate, the tap density of the rigid, binder free agglomerates is one of the characteristics that can be used to identify agglomerates that are suitable for use in electrochemical cells. Preferably, the tap density of the agglomerates is less than 2.95 g/cc. More preferably, the tap density is less than 2.85 g/cc. Even more preferably, the tap density is less than 2.60 g/cc. Most preferably, the tap density is less than 2.40 g/cc. Tap density is measured using the following procedure. First, dispense fifty grams of the binder free zinc agglomerates into a fifty milliliter graduated cylinder. Second, secure the graduated cylinder containing the zinc agglomerates onto a tap density analyzer such as a model AT-2 "Auto Tap" tap density analyzer made by Quanta Chrome Corp. of Boynton Beach, Fla., U.S.A. Third, set the tap density analyzer to tap five hundred and twenty times. Fourth, allow the tap density analyzer to run thereby tapping the graduated cylinder by rapidly displacing the graduated cylinder in the vertical direction five hundred and twenty times. Fifth, read the final volume of agglomerated zinc in the graduated cylinder. Sixth, determine the tap density of the agglomerates by dividing the weight of the agglomerates by the volume occupied by the agglomerates after tapping.

Figure 7:
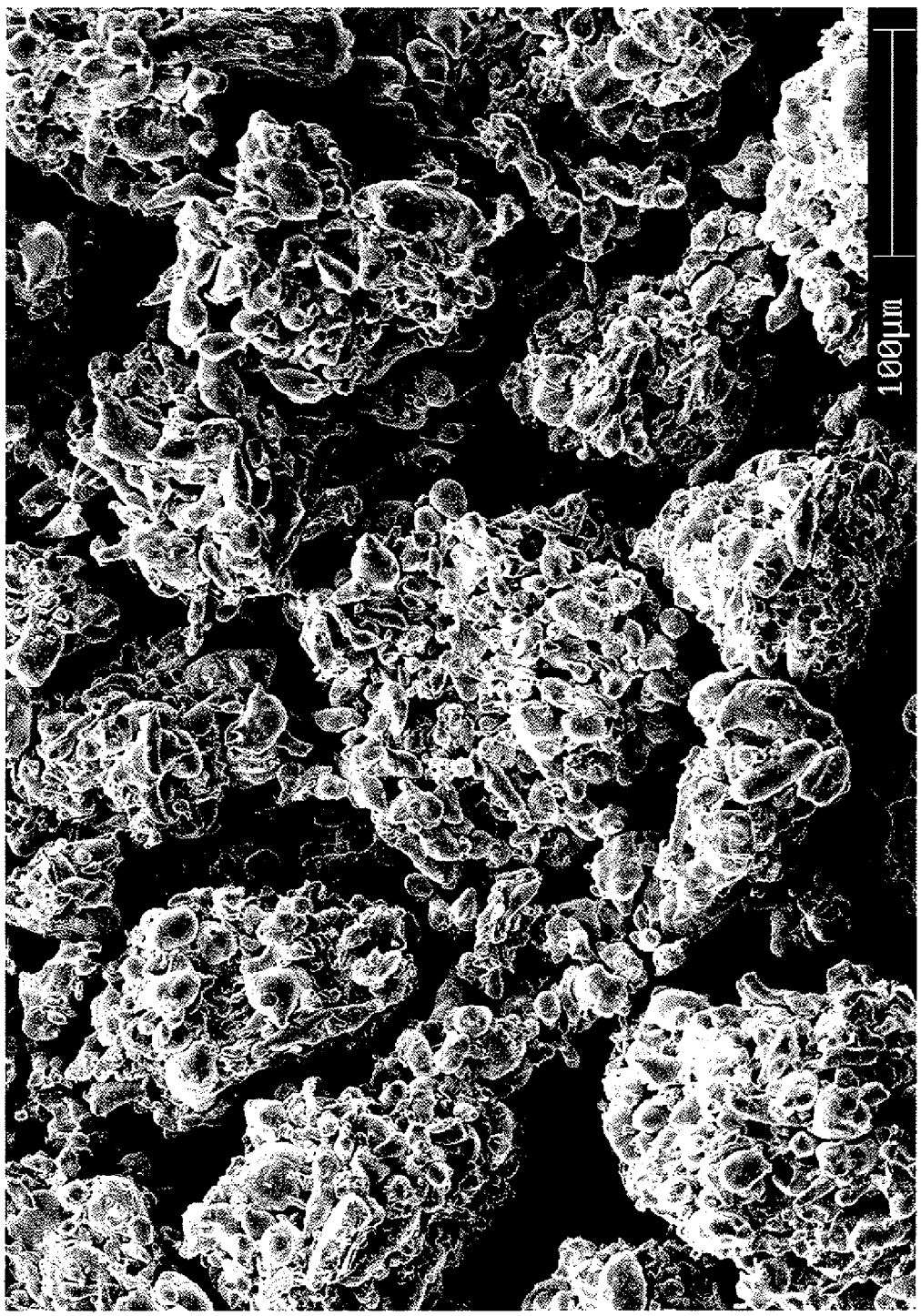
FIG. 7 is a scanning electron micrograph of zinc powder agglomerates.

Compaction of comminuted electrochemically active material to form rigid, binder free agglomerates is a preferred manufacturing process because a large quantity of agglomerates can be generated quickly and inexpensively. Shown in FIG. 7 is a scanning electron micrograph (SEM) of agglomerated zinc particles. The agglomerates were produced using a roll compaction process that did not utilize additional energy input during the production process. Despite the compaction, the individual particles of zinc are readily distinguishable components of the agglomerates. The agglomerates are highly porous structures that are capable of storing a liquid, such as the electrolyte in an electrochemical cell, within the agglomerate. The agglomerates were formed without using a binder or pore former. Consequently, the surfaces of the particles are not coated and the voids between particles are not plugged with a binder that could inhibit the electrochemical performance of the zinc particles.

Figure 8:
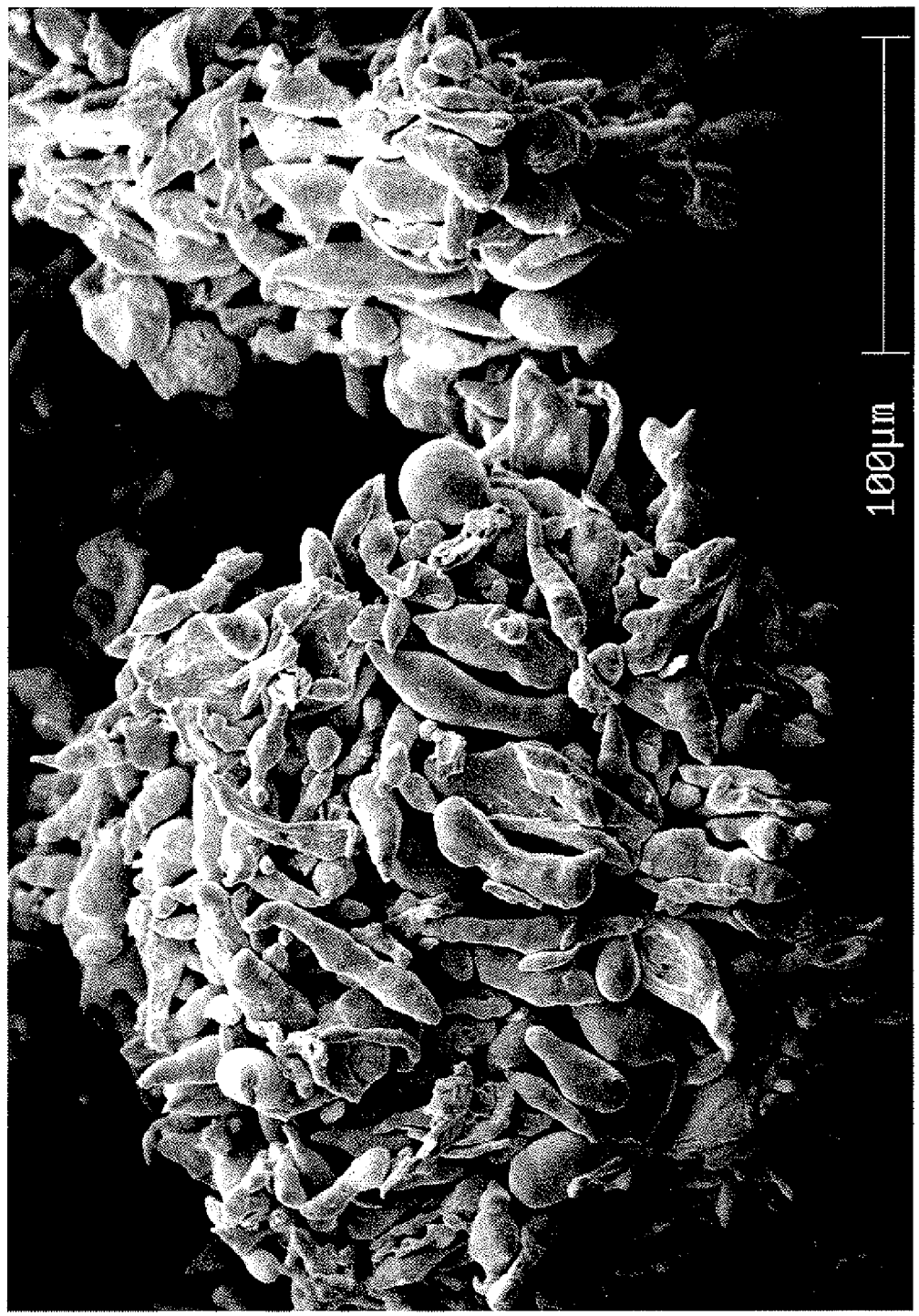
FIG. 8 is a scanning electron micrograph of zinc powder agglomerates.

Other processes, referred to herein as direct fusing processes, can also be used to produce rigid, binder free agglomerates. One fusing process uses ultrasonic energy to fuse particles of the electrochemically active material to one another until binder free, rigid agglomerates with the desired tap density and size are obtained. Shown in FIG. 8 is an SEM of zinc agglomerates formed using ultrasonic energy. The agglomerates were formed without the use of a binder or other agglomerant. The size and shape of the individual particles are not distorted by the use of ultrasonic energy to fuse individual particles to one another. The agglomerates are highly porous structures capable of trapping and retaining liquid within the pores of the agglomerate.

Figure 9:
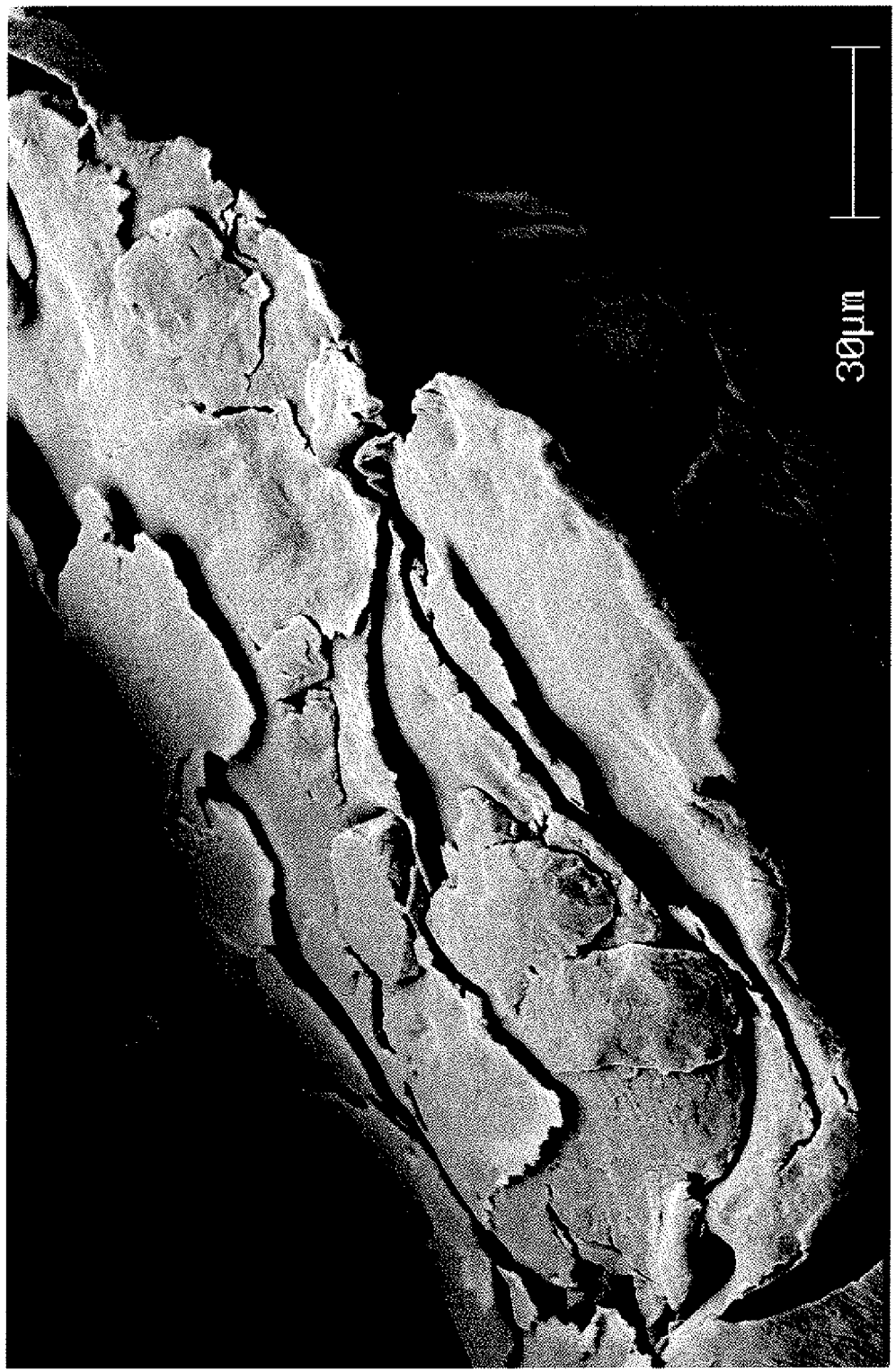
FIG. 9 is a scanning electron micrograph of zinc powder agglomerates.

Shown in FIG. 9 is an SEM of zinc particles formed using both compaction and ultrasonic energy. The individual particles of zinc were compressed during the compaction process thereby eliminating many of the voids between the particles.

Figure 2:
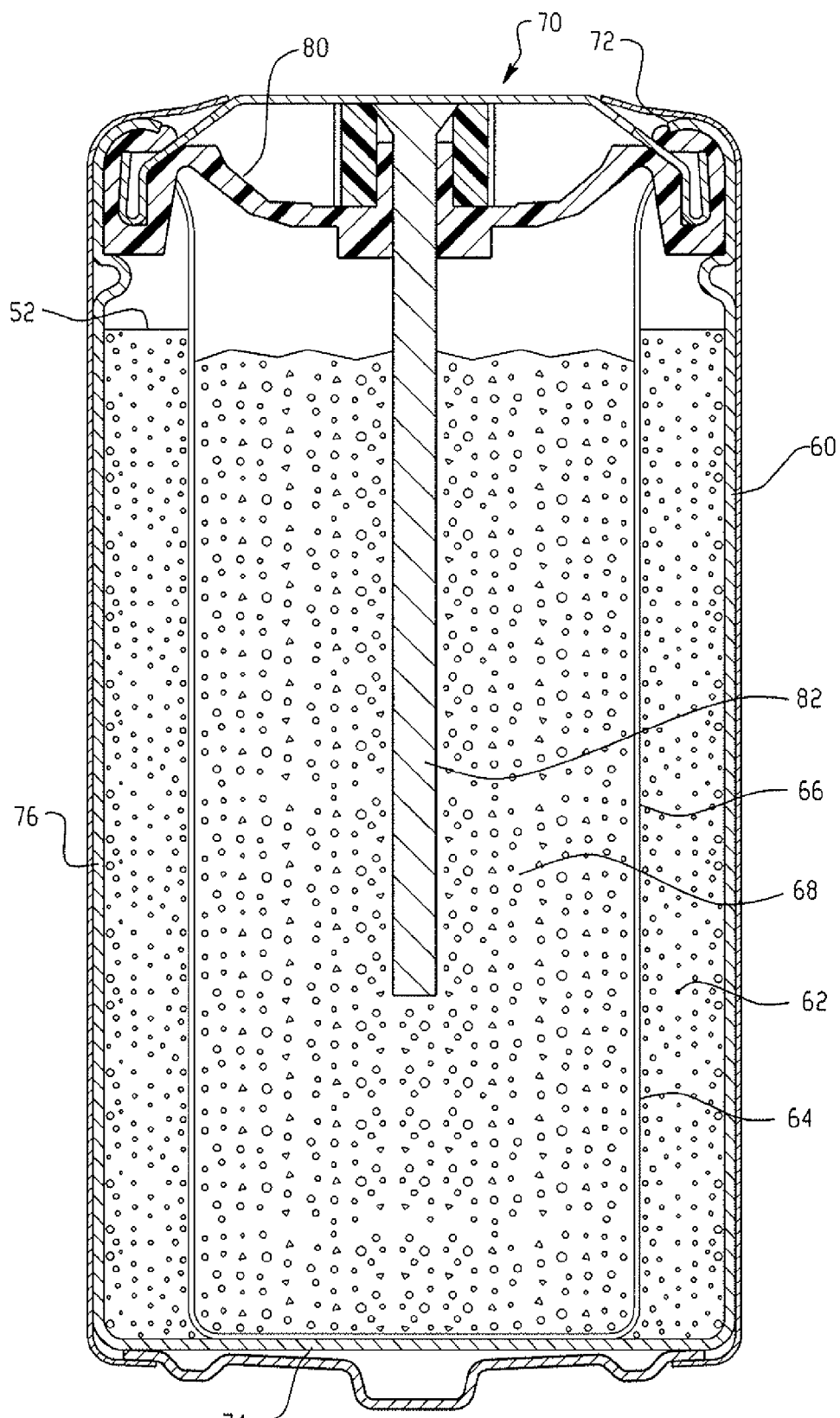
FIG. 2 is a cross section of an electrochemical cell of this invention that includes rigid, binder free agglomerates made by the process shown in FIG. 1.

Referring now to FIG. 2, there is shown a cross-sectional view of an electrochemical cell. Beginning with the exterior of the cell, the cell's components are the container 60, first electrode 62 positioned adjacent the interior surface of container 60, separator 64 contacting the interior surface 66 of first electrode 62, second electrode 68 disposed within the cavity defined by separator 64 and closure member 70 which is secured to container 60. Container 60 has an open end 72, a closed end 74 and a sidewall 76 therebetween. The closed end 74, sidewall 76 and closure member 70 define a volume in which the cell's electrodes and electrolyte are housed. A quantity of electrolyte, such as a thirty-seven percent by weight aqueous solution of potassium hydroxide, is placed in contact with the first electrode 62, second electrode 68 and separator 64.

First electrode 62 includes manganese dioxide as the electrochemically active material and an electrically conductive component, such as graphite. Additives, such as Teflon® and polyethylene, may be added to the flowable dry mixture of manganese dioxide and graphite. The mixture is molded against the interior surface 78 of container 60 thereby forming a cylinder. Separator 64 is inserted into the cylinder defined by first electrode 62 thereby providing an electrically non-conductive, ionically permeable layer on the interior surface of first electrode 62.

Second electrode 68 includes an electrochemically active component, such as zinc particles, a gelling agent and an aqueous based alkaline electrolyte. A suitable gelling agent is a crosslinked polyacrylic acid, such as Carbopol 940®, which is available from Noveon of Cleveland, Ohio, U.S.A. Carboxymethylcellulose, polyacrylanide and sodium polyacrylate are examples of other gelling agents that are suitable for use in an alkaline electrolyte solution. The aqueous based alkaline electrolyte includes thirty-six percent, by weight, potassium hydroxide, three percent, by weight, zinc oxide, and three-tenths of one percent, by weight, sodium silicate. The remainder of the solution is water. An aqueous based alkaline solution of 0.1 N potassium hydroxide is incorporated into the second electrode's manufacturing process. Other additives, such as organic and/or inorganic corrosion inhibitors, may also be included in the second electrode. Indium hydroxide is an example of a suitable inorganic corrosion inhibitor. The second electrode's components are blended to form a flowable gel. The zinc particles typically account for 63% to 72% by weight of the second electrode which may also be referred to herein as the anode.

Closure member 70 is secured to the open end of container 60 thereby sealing the electrochemically active ingredients within the cell. The closure member includes a seal member 80 and a current collector 82. In other embodiments, the seal body could be a ring shaped gasket. The seal member includes a vent that will allow the seal member to rupture if the cell's internal pressure becomes excessive. The seal member may be made from Nylon 6,6 or another material, such as a metal, provided the current collector is electrically insulated from the container which serves as the current collector for the first electrode. Current collector 82 is an elongated nail shaped component made of brass. The collector is inserted through a centrally located hole in the seal member.

Figure 4:
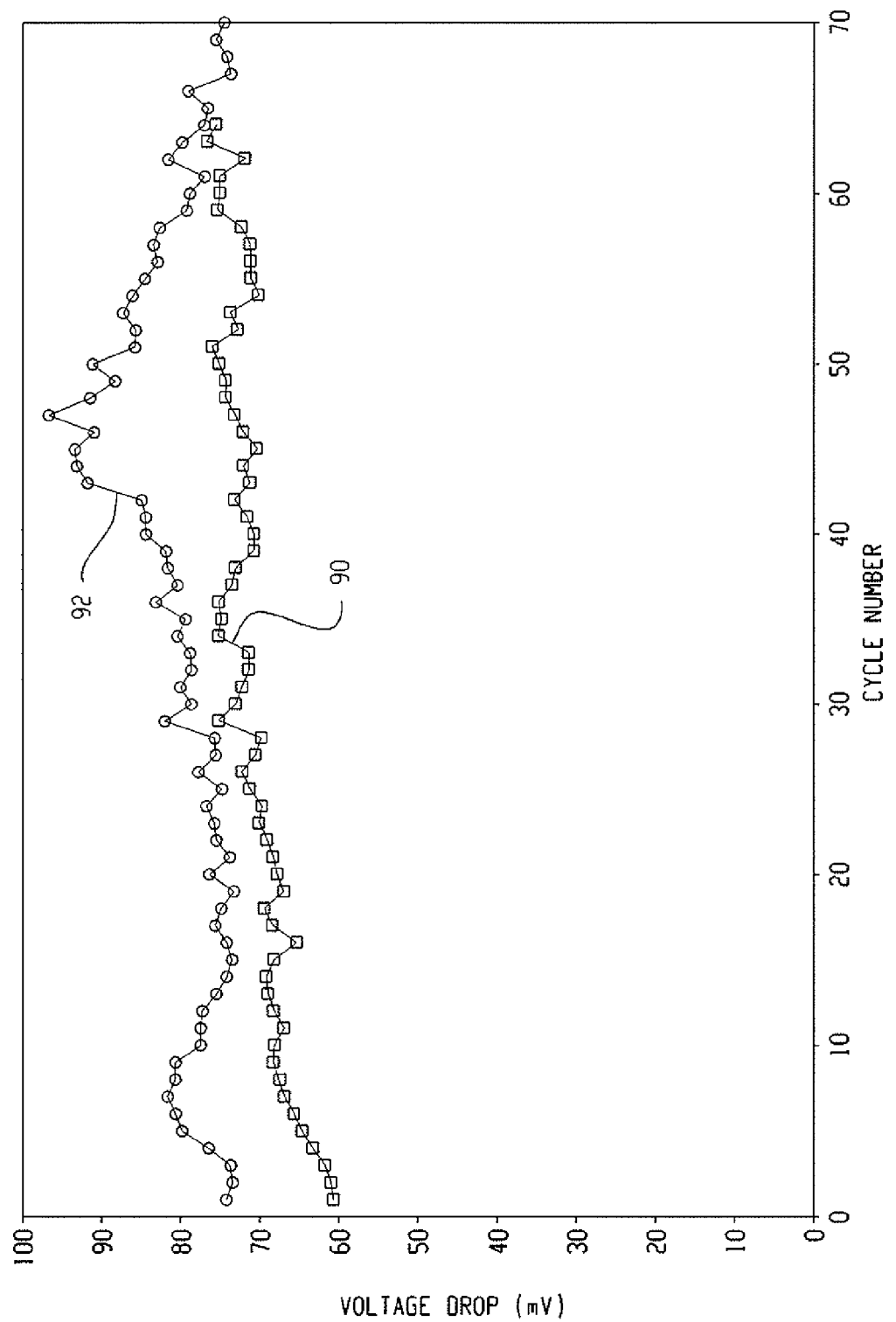
FIG. 4 shows a line chart of internal resistance data.
Figure 5:
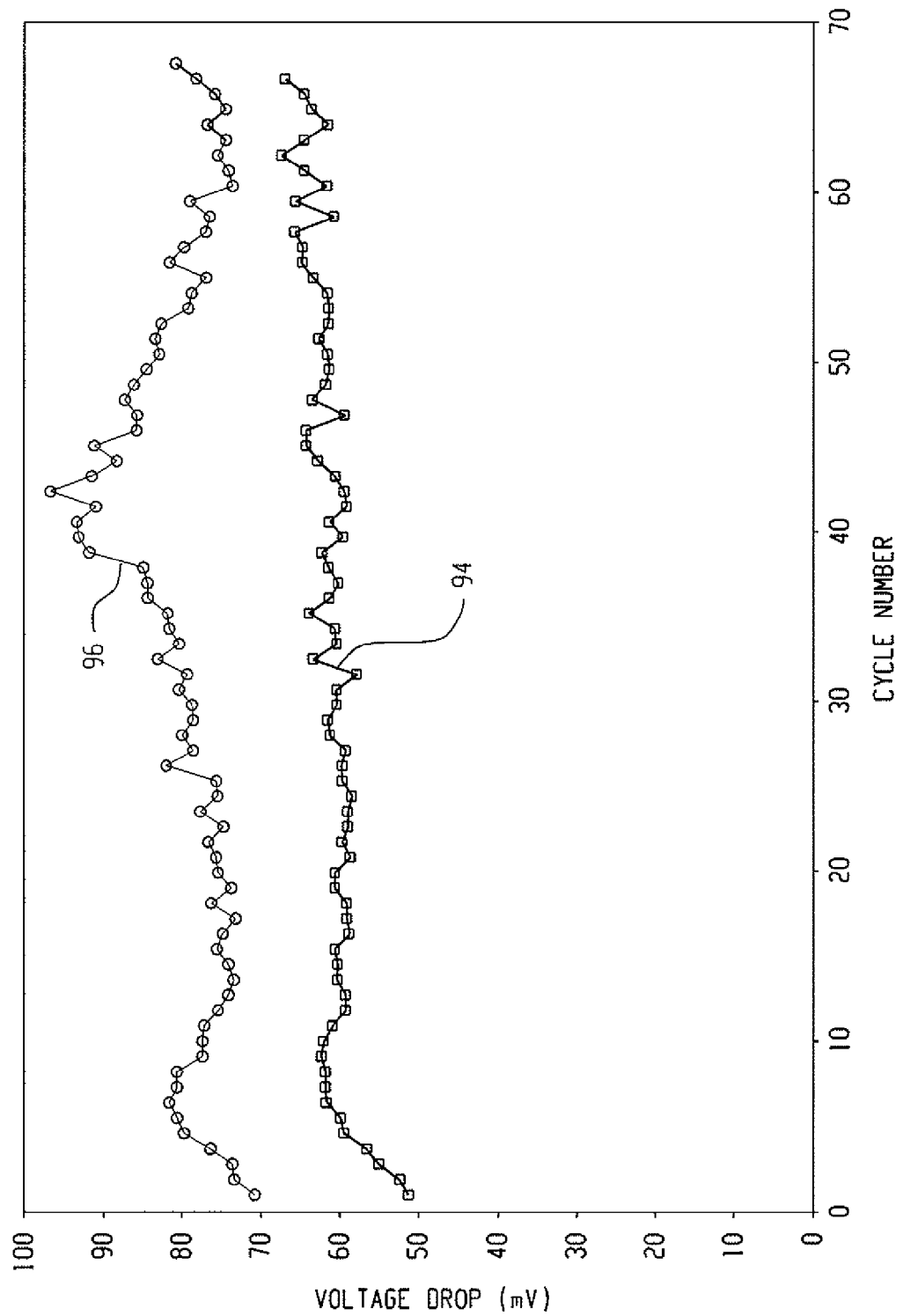
FIG. 5 shows a line chart of internal resistance data.
Figure 6:
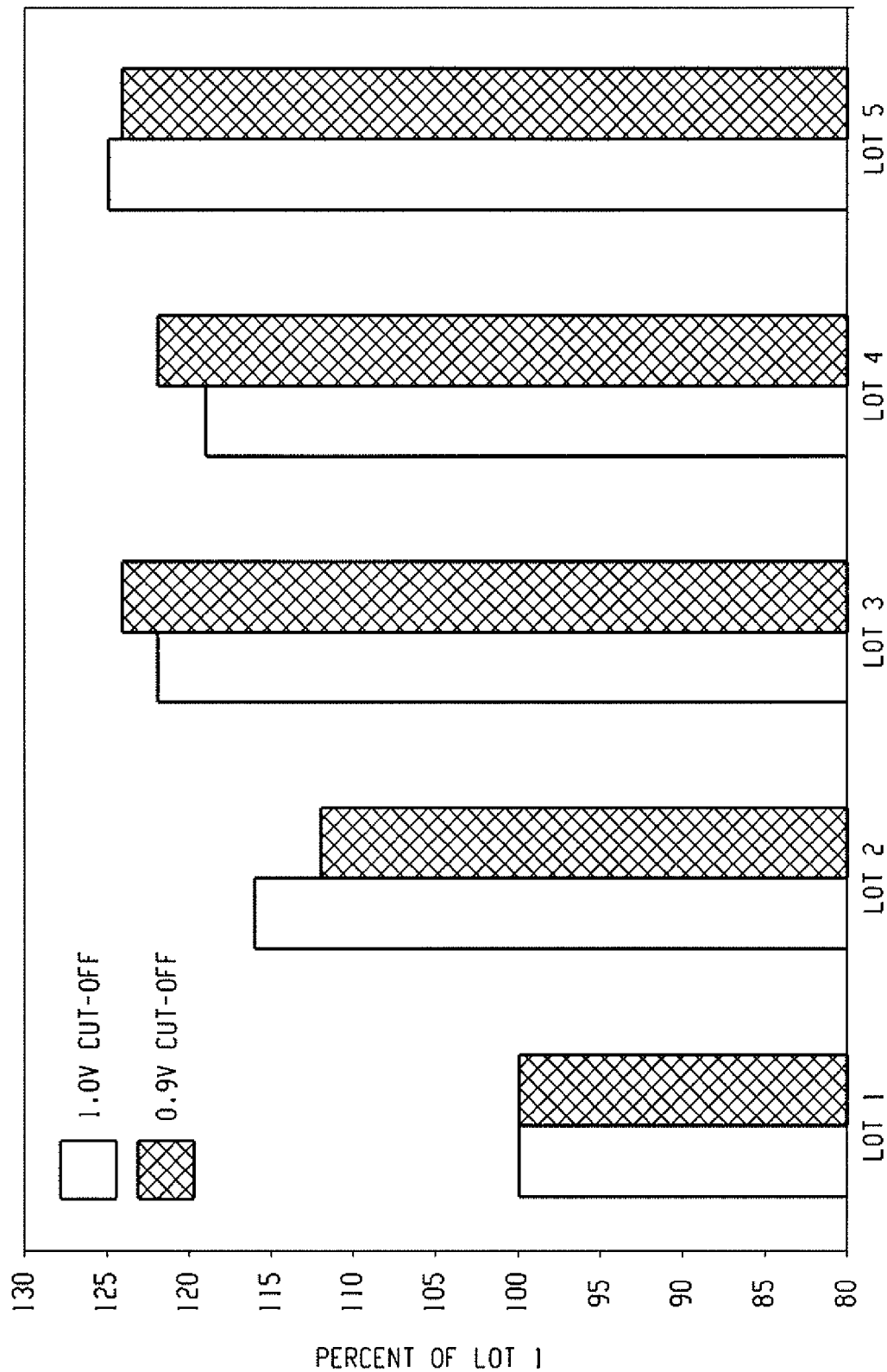
FIG. 6 shows a bar chart of cell service data.

To demonstrate the advantages made possible by the process of this invention, conventional zinc powder was processed according to the following description and then used to manufacture electrochemical cells. The cells were then characterized by discharging them on a service test to determine the cells' run time. The internal resistance of representative cells was also measured. The data shown in FIG. 4 and FIG. 5 provide evidence that the cells made with rigid, binder free agglomerates of zinc in the cell's anode had a lower internal resistance during the discharge of the cells than did the comparable control cells which had an equivalent quantity of electrochemically active material that did not include any rigid, binder free agglomerates of zinc. Furthermore, as shown in FIG. 6, the cells comprising the rigid, binder free, zinc agglomerates had significantly longer run times than did the cells with an equivalent quantity of electrochemically active material that did not include any rigid, binder free agglomerates of zinc.

In one trial, anodes for cells of the present invention were prepared as follows. First, a quantity of zinc alloy, in particulate form, was provided. The zinc alloy included 100 ppm of bismuth, 200 ppm of indium and 100 ppm of aluminum. The zinc powder was sieved by disposing the particles on a mesh screen with multiple openings and then vibrating the particles across the screen so that particles smaller than the openings would pass through the screen and particles larger than openings would not pass through the screen. The screen was constructed so that each opening had the same dimensions as every other opening in the screen. The zinc powder was sieved so that the particles smaller than 70 microns and larger than 25 microns were collected in a first portion of powder. Particles larger than 70 microns were collected in a second portion of powder. Only the first portion of powder was then fed through a roll mill compactor and granulator as depicted in FIG. 3. A suitable roll compactor and granulator may be purchased from the Fitzpatrick Company of Elmhurst, Ill., U.S.A. In this trial, the compactor's rollers were made from 316 stainless steel and had a roll surface finish, prior to the application of a ceramic coating, of 32-62 RA. The ceramic coating had a thickness of 0.13 mm to 0.18 mm and a hardness of 72 Rockwell C. The roller's speed was three revolutions per minute. The roll pressure was 2,260 pounds per linear inch. The speed of the horizontal screw was 16 RPM, and the speed of the vertical screw was 175 RPM. The gap between the rollers was set at 0.254 mm.

After passing through the roll compactor, the comminuted particles were formed into strips of agglomerated particles that were fed into a granulator that fractured the strip into smaller granules of agglomerated particles. The speed of the granulator's rotor was 1000 RPM. The opening in the granulator's screen was 1.27 mm. The agglomerates that passed through the granulator's screen were then sorted using a 40 mesh, US standard, screen. The openings in a 40 mesh screen allow only agglomerates smaller than 420 microns to flow through the screen. The screening process generated a first distribution of agglomerates that flowed through the 40 mesh screen and a second distribution of agglomerates that did not flow through the 40 mesh screen. The rigid, binder free agglomerates in the first distribution had a tap density of 2.83 g/cc and the size of the agglomerates was between 150 microns and 300 microns. The following anode mixes were then prepared with only the first distribution of agglomerates. The quantities of the anode components are in percent by weight.

| | Lot Number | | | | |
|---|---|---|---|---|---|
| Anode Component | 1 | 2 | 3 | 4 | 5 |
| Zinc | | | | | |
| Agglomerated | — | 68.00 | 34.00 | 17.00 | 8.50 |
| Non-agglomerated | 68.00 | — | 34.00 | 51.00 | 59.50 |
| Gelling Agent | 0.44 | 0.44 | 0.44 | 0.44 | 0.44 |
| 36% KOH Electrolyte w/ZnO and sodium silicate | 30.20 | 30.20 | 30.20 | 30.20 | 30.20 |
| 0.1 N KOH | 1.36 | 1.36 | 1.36 | 1.36 | 1.36 |
| TOTAL | 100.00 | 100.00 | 100.00 | 100.00 | 100.00 |

AA size batteries were then made with each of the anode mixes. Within all five lots, all of the cell components except for the anode mixes were identical.

FIG. 6 shows the run times for cells from all five lots that were discharged per the following test regime. Each cell was "pulse" tested by individually discharging the cell at a rate of one amp for sixty seconds and then allowing the cell to rest for five seconds before the next pulse was begun. Each "sixty seconds on/five seconds off" cycle was counted as one pulse. The test was continued until the cell's closed circuit voltage fell below a 0.9 volt cutoff. The number of pulses that each cell provided before the cell's closed circuit voltage fell below the voltage cutoff was recorded. Shown in FIG. 6, in bar chart format, is the data collected from the pulse testings. Lot number one is the "control" lot that incorporated only non-agglomerated zinc particles in the anode. The average number of pulses provided by the cells in lot one was defined as 100% for the purpose of creating a numerical performance standard against which the other lots could be normalized. The cells in lot number two contained only agglomerated zinc particles. In lot number three, one-half of the zinc, by weight, had been agglomerated and the other half had not been agglomerated. In lot number four, one-fourth of the zinc in each cell had been agglomerated and three-fourths was non-agglomerated. In lot number five, one-eighth of the zinc in each cell had been agglomerated and seven-eighths of the zinc had not been agglomerated. The data in FIG. 6 demonstrates that the electrochemical cells, in which at least a portion of the zinc was agglomerated into rigid, binder free agglomerates, provided approximately 12% to 23% more run time than comparable cells that contained only non-agglomerated zinc. Furthermore, the cells that contained no more than one-half of their zinc in the form of rigid, binder free agglomerates provided more service than cells that contained all of their zinc in the form of rigid, binder free agglomerates. Thus, the advantage of incorporating rigid, binder free agglomerates of zinc into the anode of alkaline electrochemical cells has been demonstrated.

In another trial, a quantity of comminuted zinc particles was agglomerated in a process similar to the previously described process used to produce agglomerates for lots two through five, except that the size of the agglomerates was limited to less than 825 microns but more than 250 microns for lot six and less than 250 microns but more than 100 microns for lot seven. Three lots of AA size cells were made in order to characterize the impact that incorporating rigid, binder free agglomerates of zinc into the anode would have on the cell's internal resistance during discharge on the previously described sixty seconds on/five seconds off, one amp constant current test. The anode formulas used to make the three lots of cells are shown below. The quantities of the anode components are in percent by weight.

| | Lot Number | | |
|---|---|---|---|
| Anode Component | 6 | 7 | 8 |
| Zinc | | | |
| Agglomerated | 70.00 | 35.00 | — |
| Agglomerate size | 250-825 microns- | 100-250 microns | — |
| Non-agglomerated | — | 35.00 | 70.00 |
| Gelling Agent | 0.42 | 0.42 | 0.42 |
| 36% KOH Electrolyte with zinc oxide and sodium silicate | 28.39 | 28.39 | 28.39 |
| Indium Hydroxide | 0.02 | 0.02 | 0.02 |
| 0.1 N KOH | 1.17 | 1.17 | 1.17 |
| TOTAL | 100.00 | 100.00 | 100.00 |

Within all three lots, all of the cells' components except for the anode mixes were identical.

Shown in FIG. 4 are two line graphs which show the changes in internal resistance when cells from lot 6, represented by line 90, and lot 8, represented by line 92, were discharged on the pulse test. The data clearly shows that the cells in lot six, which incorporated only rigid, binder free agglomerates, had lower voltage drops during discharge than did the comparable cells in lot eight that utilized only non-agglomerated zinc. The lower voltage drop is indicative of a lower internal resistance. As the cell's internal resistance decreases, the cell's run time will increase.

Shown in FIG. 5 are two line graphs which show the changes in internal resistance when cells from lot 7, represented by line 94, and lot 8, represented by line 96, were discharged on the pulse test. This data clearly shows that cells in lot 7, which incorporated 50% by weight rigid, binder free zinc agglomerates and 50% by weight non-agglomerated zinc, had lower voltage drops during discharge on the pulse test than did the comparable cells in lot 8 that utilized only non-agglomerated zinc.

The data in FIGS. 4, 5 and 6 demonstrate that including rigid, binder free agglomerates of zinc in the anode of electrochemical cells improves cell performance by reducing the anode's internal resistance during the discharge of the cell thereby allowing the cell's run time to be increased.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the Doctrine of Equivalents.

What is claimed is:

1. An electrochemical cell having an electrode comprising a plurality of agglomerates, wherein the plurality of agglomerates are made by a process comprising the steps of:
   (a) providing an electrochemically active material in comminuted form, wherein said electrochemically active material consists essentially of at least one selected from the group consisting of: zinc and an alloy of zinc;
   (b) forming a plurality of rigid, binder free agglomerates consisting essentially of said electrochemically active material, wherein a tap density of said agglomerates is less than 2.85 g/cc; and wherein said non-agglomerated particles comprise particles shaped as flakes.

2. The electrochemical cell of claim 1, wherein said forming step comprises the step of directly fusing said comminuted active material.

3. The electrochemical cell of claim 2, wherein said step of directly fusing said comminuted active material comprises exposing said active material to ultrasonic vibrations.

4. The electrochemical cell of claim 1, wherein said process further includes the step of annealing said rigid, binder free agglomerates.

5. The electrochemical cell of claim 4, wherein said annealing step comprises heating said agglomerates above 100° C. but below melting points of said active material.

6. An electrochemical cell having an electrode comprising a plurality of agglomerates, wherein the plurality of agglomerates are made by a process comprising the steps of:
   (a) providing an electrochemically active material in comminuted form, wherein said electrochemically active material consists essentially of at least one selected from the group consisting of: zinc and an alloy of zinc;
   (b) forming a plurality of rigid, binder free agglomerates consisting essentially of said electrochemically active material, wherein a tap density of said agglomerates is less than 2.85 g/ee; and wherein, prior to forming the agglomerates, said active material is limited to particles that will flow through a 40 mesh US standard screen but will not flow through a 325 mesh US standard screen.

7. The electrochemical cell of claim 6, wherein said alloy of zinc comprises at least one element selected from the group consisting of bismuth, indium, magnesium and aluminum.

8. An electrochemical cell having an electrode comprising a plurality of agglomerates, wherein the plurality of agglomerates are made by a process comprising the steps of:
   (a) providing an electrochemically active material in comminuted form, wherein said electrochemically active material consists essentially of at least one selected from the group consisting of: zinc and an alloy of zinc;
   (b) forming a plurality of rigid, binder free agglomerates consisting essentially of said electrochemically active material, wherein a tap density of said agglomerates is less than 2.85 g/cc; and wherein at least 95% by weight of said agglomerates will pass through a 40 mesh US standard screen and will not pass through a 325 mesh US standard screen.

9. The electro chemical cell of claim 8, wherein said forming step comprises compacting said active material.

10. The electrochemical cell of claim 9, wherein said process further includes the step of granulating said compacted agglomerates thereby forming granulated agglomerates.

11. The electrochemical cell of claim 10, wherein said process further includes the step of selecting said granulated agglomerates that can flow through a 40 mesh US standard screen.

12. An electrochemical cell containing an electrode comprising a plurality of rigid, binder free agglomerates of an electrochemically active material, wherein said electrochemically active material consists essentially of at least one selected from the group consisting of: zinc and an alloy of zinc, and wherein a tap density of said agglomerates is less than 2.85 g/cc.

13. The electrochemical cell of claim 12, wherein said agglomerates consist of said electrochemically active material.

14. An electrochemical cell having an electrode comprising a plurality of agglomerates, wherein the plurality of agglomerates are made by a process comprising the steps of:
   (a) providing an electrochemically active material in comminuted form, wherein said electrochemically active material consists essentially of at least one selected from the group consisting of: zinc and an alloy of zinc;
   (b) forming a plurality of rigid, binder free agglomerates consisting essentially of said electrochemically active material, wherein said agglomerates flow through a 420 micrometer opening size (40 mesh) screen; and
wherein said active material is limited to particles that will not flow through a 325 mesh US standard screen.

15. The electrochemical cell of claim 14, wherein said agglomerates have a particle size in the range of 25-70 microns.

16. The electrochemical cell of claim 14, wherein said forming step comprises compacting said active material.

17. The electrochemical cell of claim 14, wherein said process further includes the step of granulating said compacted agglomerates thereby forming granulated agglomerates.

18. The electrochemical cell of claim 17, wherein said process further includes the step of selecting said granulated agglomerates that can flow through a 40 mesh US standard screen.

19. The electrochemical cell of claim 14, wherein said forming step comprises the step of directly fusing the comminuted active material.

20. The electrochemical cell of claim 19, wherein said step of directly fusing the comminuted active material comprises exposing said active material to ultrasonic vibrations.

21. The electrochemical cell of claim 14, wherein said process further includes the step of annealing said rigid, binder free agglomerates.

22. The electrochemical cell of claim 14, wherein said alloy of zinc comprises at least one element selected from the group consisting of bismuth, indium, magnesium and aluminum.

23. An electrochemical cell containing an electrode comprising a plurality of rigid, binder free agglomerates of an electrochemically active material, wherein said electrochemically active material consists essentially of at least one selected from the group consisting of: zinc and an alloy of zinc, and wherein said agglomerates flow through a 420 micrometer opening size (40 mesh) screen.

24. The electrochemical cell of claim 23, wherein said agglomerates consist of said electrochemically active material.

* * * * *